(12) United States Patent  
Venugopal et al.

(10) Patent No.: US 8,924,555 B2
(45) Date of Patent: Dec. 30, 2014

(54) NETWORK RESOURCE CONSOLIDATION AND DECOMMISSIONING ANALYSIS

(75) Inventors: Nandagopal Venugopal, Plano, TX (US); Thomas P. Newcomer, Rowlett, TX (US); Agustin Pecorari, Buenos Aires (AR)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 546 days.

(21) Appl. No.: 13/253,474

(22) Filed: Oct. 5, 2011

(65) Prior Publication Data

US 2013/0091257 A1  Apr. 11, 2013

(51) Int. Cl.
*H04L 12/24* (2006.01)
(52) U.S. Cl.
CPC .......... *H04L 41/0826* (2013.01); *H04L 41/145* (2013.01); *H04L 41/0803* (2013.01)
USPC .......................................... 709/225; 709/226
(58) Field of Classification Search
CPC ..... H04L 47/70; H04L 41/08; H04L 41/0896; H04L 41/0803; H04L 41/145; G06Q 10/06312; G06F 11/3051; G06F 11/3006; G06F 11/3058; H04M 15/00; H04M 15/41
USPC .................................................. 709/223, 226
See application file for complete search history.

(56) References Cited

U.S. PATENT DOCUMENTS

| | | | | |
|---|---|---|---|---|
| 7,725,035 | B2* | 5/2010 | Tyan et al. | 398/115 |
| 8,185,088 | B2* | 5/2012 | Klein et al. | 455/409 |
| 8,204,809 | B1* | 6/2012 | Wise | 705/35 |
| 2009/0059856 | A1* | 3/2009 | Kermoal et al. | 370/329 |
| 2011/0086611 | A1* | 4/2011 | Klein et al. | 455/407 |

* cited by examiner

*Primary Examiner* — Kristie Shingles

(57) ABSTRACT

A method and system for providing a computing environment that permits simulations directed towards the consolidation and decommissioning of network elements associated with a network. The computing environment permits a user to designate a network element for decommission and exclude a network element from decommission and/or consolidation. The computing environment includes consolidation and decommission analytics that minimize a total operational cost of the network including leased network elements. The consolidation and decommission analytics includes accounting for penalties associated with early termination of leases and break-even values.

20 Claims, 20 Drawing Sheets

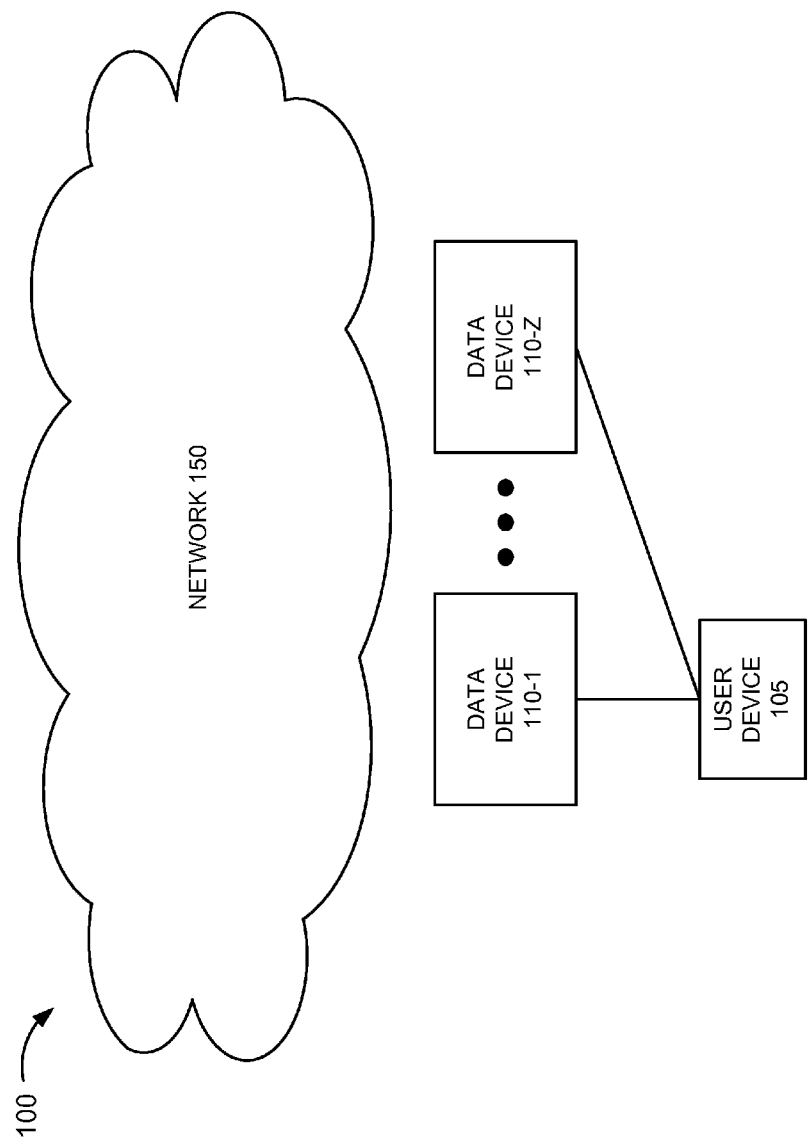

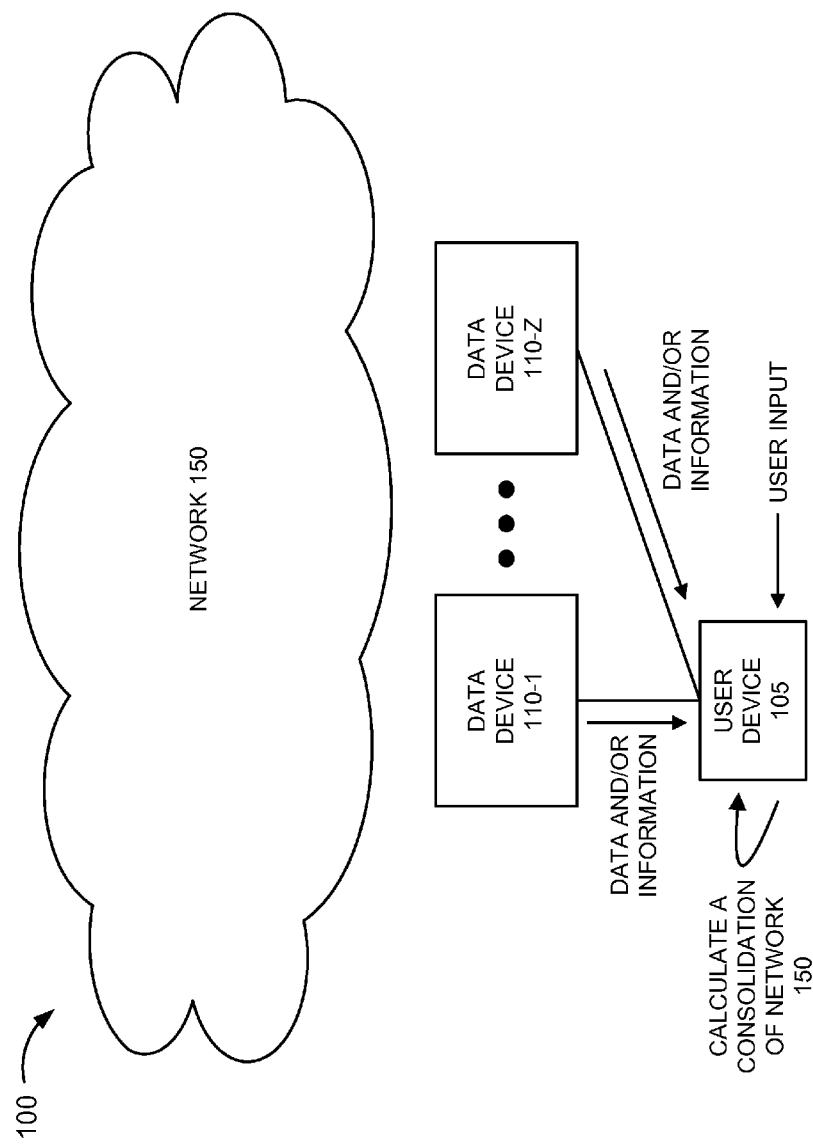

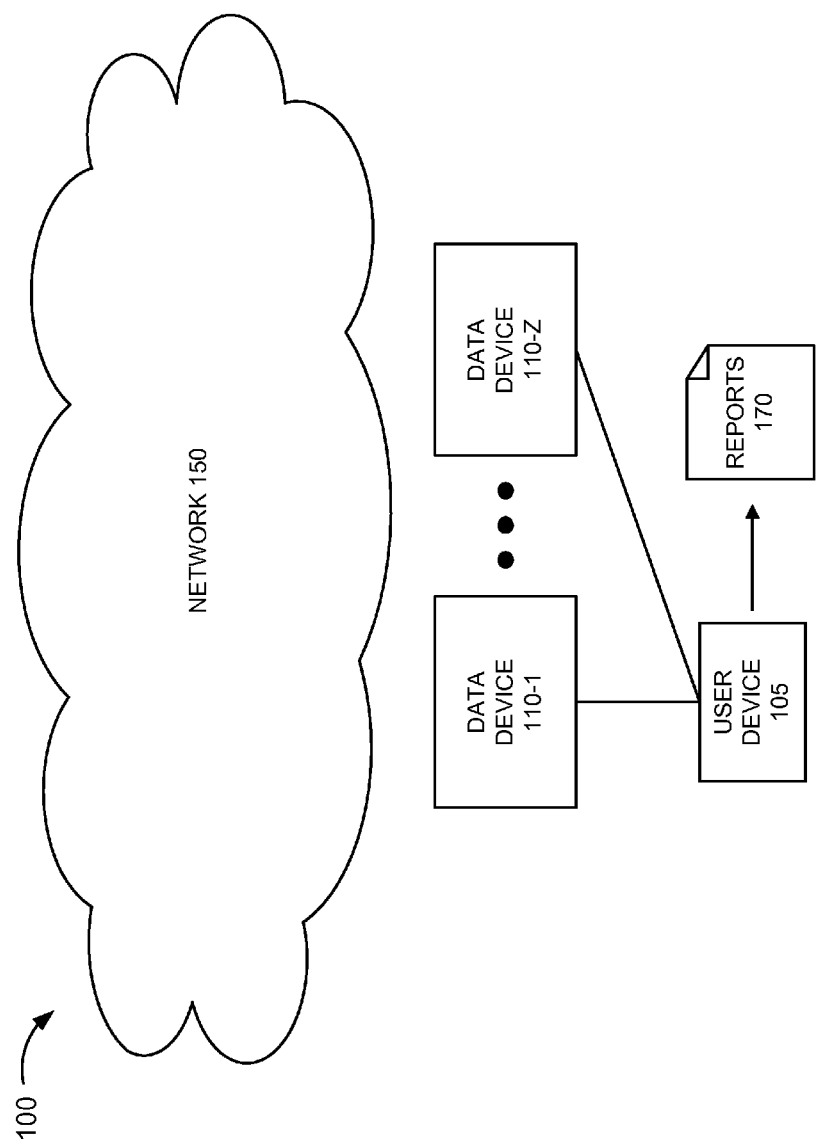

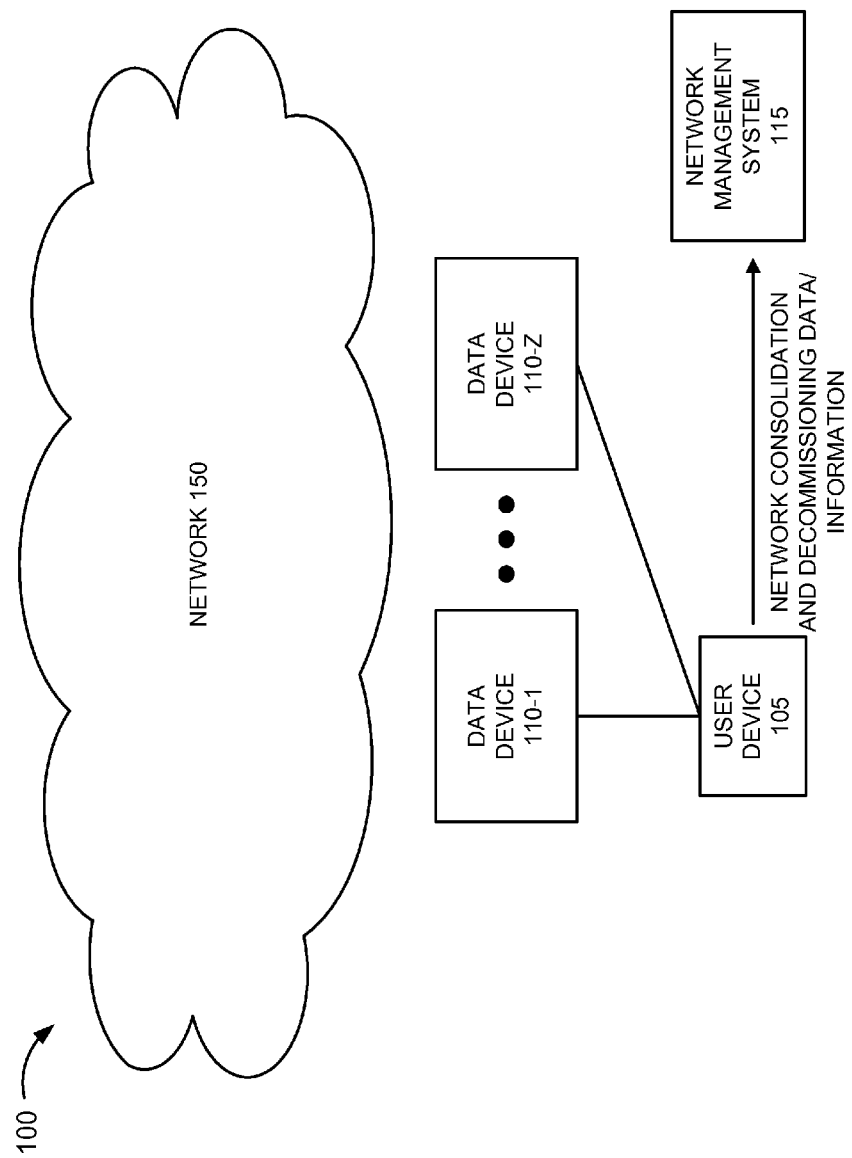

| DS3 EF CONSOLIDATION SUMMARY REPORT | |
|---|---|
| DESCRIPTION – LATA 356; ID 1592 | VALUE |
| INITIAL NUMBER OF HUBS | 55 |
| INITIAL NUMBER OF EFS | 218 |
| NUMBER OF HUBS TO DECOMMISSION | 0 |
| NUMBER OF DECOMMISSIONED HUBS | 2 |
| NUMBER OF CONSOLIDATED EFS | 32 |
| INCUMBENT COST OF EFS | $250,000 |
| INCUMBENT COST OF EFS (NOT EXCLUDED) | $250,000 |
| NUMBER OF MISMATCHED CIRCUITS | 1,230 |
| NUMBER OF BLOCKED CIRCUITS | 0 |
| MTL PENALTY OF CONSOLIDATED EFS | $0.00 |
| MONTHLY SAVINGS OF CONSOLIDATED EFS | $74,565 |
| INCUMBENT COST OF THE RIDERS | $450,000 |

Fig. 5A

| DS3 EF CONSOLIDATION SUMMARY REPORT | |
|---|---|
| DESCRIPTION – LATA 356; ID 1592 | VALUE |
| COST OF UNKNOWN CIRCUIT MOVES | 55 |
| COST | 218 |
| NEW COST OF THE RIDERS | 0 |
| EFFECTIVE SAVINGS | 2 |
| EFFECTIVE BREAK-EVEN | 32 |
| INCUMBENT COST OF EFS | $250,000 |

RECORD 1 OF 20

EXPORT TO

CLOSE

Fig. 5B

| HUB | NUMBER OF FACILITIES | TOTAL EFF. COST | DECOMM REQUESTED | DECOMM. | COST AFTER CONSOLID. | BREAK-EVEN |
|---|---|---|---|---|---|---|
| EFTWW11 | 3 | $1,458.36 | N | N | $1,458.36 | 0 |
| CDBGT90 | 1 | $3,444.52 | Y | Y | $2,657.48 | 0 |
| | | | | | | |
| | | | | | | |
| | | | | | | |

DECOMMISSIONED HUBS REPORT

Fig. 6

DECOMMISSIONED FACILITIES REPORT

| CIRCUIT ID | HUB | TOTAL RECUR. COST | PENALTY | BREAK-EVEN | ACTIVE | BLOCKED | MISMATCH | SPARE |
|---|---|---|---|---|---|---|---|---|
| 2P2Y5205 | FDUL5 | $1,722.26 | $0.00 | 0 | 3 | 0 | 0 | 0 |
| 2P2DY004 | MIL230 | $2,890.56 | $0.00 | 0 | 17 | 0 | 9 | 3 |
| | | | | | | | | |
| | | | | | | | | |
| | | | | | | | | |

Fig. 7

CIRCUIT MOVES REPORT

| NEW CFA CIRCUIT ID | NEW CFA | EXISTING CFA | CIRCUIT ID CRDW | EC CCT CMPR NBR | EXISTING HUB | FROM CLLI | TO CLLI | MILEAGE |
|---|---|---|---|---|---|---|---|---|
| 3P-2DY-002 | 80/T3/M1/ M2H | 79/T3/M5/ M4 | W0P42 | 44HCG514 | M1 | M142 | M110 | 5 |
| | | | | | | | | |
| | | | | | | | | |
| | | | | | | | | |
| | | | | | | | | |
| 805 | 810 | 815 | 820 | 825 | 830 | 835 | 840 | 845 |

NETWORK RESOURCE CONSOLIDATION AND DECOMMISSIONING ANALYSIS

BACKGROUND

Access transport management systems (ATMSs) provide users with the ability to manage access networks. Users can use access transport management systems to manage the allocation of resources and the costs associated therewith.

BRIEF DESCRIPTION OF THE DRAWINGS

FIG. 1A is a diagram illustrating an exemplary environment in which an exemplary embodiment of network resource consolidation and decommissioning analytics may be implemented;

FIGS. 1B-1D are diagrams illustrating an exemplary process pertaining to an exemplary embodiment of the consolidation and decommissioning analysis;

FIGS. 5A and 5B are diagrams illustrating an exemplary user interface of a consolidation summary report;

FIG. 6 is a diagram illustrating an exemplary user interface of a decommissioned hubs report;

FIG. 7 is a diagram illustrating an exemplary user interface of a decommissioned facilities report;

FIG. 8 is a diagram illustrating an exemplary user interface 800 of a circuit moves report;

DETAILED DESCRIPTION OF PREFERRED EMBODIMENTS

Figure 2:
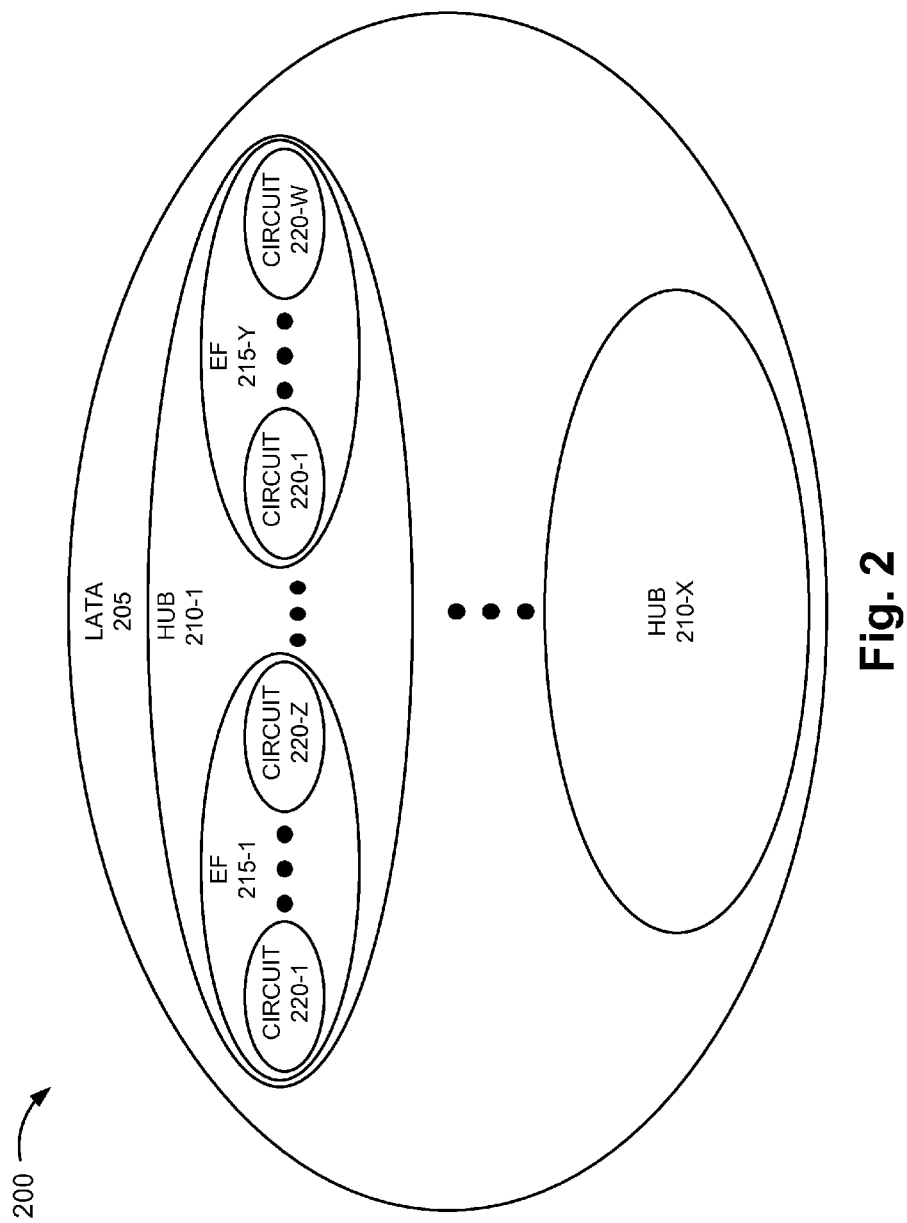
FIG. 2 is an exemplary diagram of a network.

The following detailed description refers to the accompanying drawings. The same reference numbers in different drawings may identify the same or similar elements. Also, the following detailed description does not limit the invention.

FIG. 1A is a diagram illustrating an exemplary environment in which an exemplary embodiment of devices that provide network resource consolidation and decommissioning analytics may be implemented. As illustrated in FIG. 1A, an environment 100 includes a user device 105 and data devices 110-1 through 110-Z, in which Z>1 (referred to collectively as data devices 110 or individually as data device 110). Additionally, environment 100 includes a network 150.

The number of devices and networks, and the configuration in environment 100 are exemplary and provided for simplicity. According to other embodiments, environment 100 may include additional devices, fewer devices, different devices, and/or differently arranged devices, than those illustrated in FIG. 1A.

According to other embodiments, a single device may be implemented as multiple devices and/or multiple devices may be implemented as a single device. A device may be implemented according to a centralized computing architecture or a distributed computing architecture. Additionally, a device may be implemented according to one or multiple network architectures (e.g., a client device, a server device, a peer device, or a combination thereof). Also, according to other embodiments, one or more functions and/or processes described as being performed by a particular device may be performed by a different device, or some combination of devices. Environment 100 may be implemented to include wired and/or wireless connections among the devices illustrated.

User device 105 includes a computational device. For example, user device 105 may be implemented as a computer (e.g., a desktop computer, a laptop computer, a notebook, a tablet, etc.), a terminal, a workstation, or some other type of computational device. According to an exemplary implementation, user device 105 may be considered a logical collection of physical devices, both shared and user-specific. For example, user device 105 may include a laptop computer or a desktop computer on which user interface software will function. This, in turn, will connect with a database for obtaining the problem inputs and connect with another shared network computer on which the consolidation and decommissioning analysis algorithm will execute. Reports may be stored in a database which the user interface will then retrieve for display to the users.

Data devices 110 include devices that store data and/or information. For example, data devices 110 may be implemented as a database management system that includes databases. The data and/or information stored by data devices 110 include network element information (e.g., network elements associated with network 150), network configuration information, financial information (e.g., customer billing information), contract information (e.g., lease contract information, penalty information (e.g., disconnection before contract term), etc.), network element utilization information, cost information (e.g., cost of each leased network resource, subtending cost, etc.), and other data and/or information, as described further below.

Network 150 includes one or multiple wireless and/or wired networks. For example, network 150 may include a local area network (LAN), a wide area network (WAN), a private network, a public network, a data network, a telephone network (e.g., a Public Switched Telephone Network, a cellular network, etc.), and/or an access network.

According to an exemplary embodiment, user device 105 and data devices 110 provide a computing environment that permits users to model a system. According to an exemplary implementation, the computing environment permits users to model a network (e.g., network 150) having leased network resources.

According to an exemplary embodiment, the computing environment includes an algorithm that minimizes a total operational cost of network 150 or a portion of network 150 based on a consolidation and decommissioning analysis. According to an exemplary implementation, the minimization of the total operational cost includes the decommissioning of network resources, such as leased network resources. According to an exemplary implementation, the minimization of the total operational cost includes the consolidation and optimal utilization of network resources in network 150.

According to an exemplary embodiment, the computing environment performs a consolidation and decommissioning analysis in an automated manner. According to another exemplary embodiment, the computing environment provides an interactive environment. For example, the computing environment provides graphical user interfaces to permit a user to, for example, review data from data devices 110, force a decommission of a network resource, exclude a decommission of a network resource, etc., as described further below. The computing environment provides a user with various reports based on an execution of the algorithm. Network 150 may be configured based on the consolidation and decommissioning analysis.

FIGS. 1B-1D are diagrams illustrating an exemplary process pertaining to an exemplary embodiment of the consolidation and decommissioning analysis. Referring to FIG. 1B, user device 105 obtains data and/or information from data devices 110. Additionally, user device 105 receives user inputs pertaining to the consolidation and decommissioning analysis. For example, the user may select network resources to decommission or to exclude from decommission. The user may also select other parameters, such as, spare capacity parameters that regulate remaining or left-over capacities of network resources, break-even parameters that regulate up-front costs due to consolidation, and maximum utilization parameters that limit network resource utilization.

As illustrated in FIG. 1B, user device 105 performs a consolidation and decommissioning analysis based on the data and/or information and user input. In this example, assume that the user selected network resources to decommission (e.g., forced decommissions). The user may also select other parameters, such as, spare capacity parameters that regulate remaining or left-over capacities of network resources, break-even parameters that regulate up-front costs due to consolidation, hubbing restrictions that limit circuit re-homing based on local exchange carrier-imposed rules, and maximum utilization parameters that limit network resource utilization. User device 105 simulates consolidation measures (e.g., attempts to move network resources to other network resources) directed toward the selected network resources to permit decommissioning. According to an exemplary implementation, user device 105 may disregard cost analysis. According to another exemplary implementation, user device 105 may consider cost or limits of cost (e.g., penalties, etc.) associated with the decommissioning of the selected network resources. During the simulation, user device 105 determines whether there are sufficient spare or available network resources to absorb the capacities associated with the selected network resources to permit decommissioning. According to an exemplary implementation, if there are insufficient network resources to permit decommissioning, then the network resource is not decommissioned. According to another exemplary implementation, if there are insufficient network resources to permit decommissioning, user device 105 recommends the addition of new network resources to accommodate the decommissioning. The recommendations may be based on business rules that include, for example, cost constraints and budgetary parameters. User device 105 simulates the decommissioning based on the addition of new network resources. User device 105 also performs the consolidation and decommissioning analysis directed to non-user-selected network resources based on the data and/or information and user input.

Referring to FIG. 1C, user device 105 outputs various reports 170 pertaining to the results of the consolidation and decommissioning analysis. For example, reports 170 may include a summary report that summarizes cost information (e.g., penalties, savings, new costs, etc.), number of initial network resources, number of consolidated network resources, number of decommissioned network resources, etc.

Referring to FIG. 1D, user device 105 outputs network consolidation and decommissioning data and/or information derived from the consolidation and decommissioning analysis to a network management system 115 that permits the reconfiguring of network resources of network 150. For example, network management system 115 includes one or multiple devices that have a communicative coupling to network elements of network 150 that permits the decommissioning of a network element and re-assignment of demands (e.g., customer demands) associated with a network element.

As described above, network 150 may include one or multiple networks of different types, which in turn, may include different types of network resources (e.g., network elements) and resources (e.g., bandwidth, etc.) that stem therefrom. As a further example of an exemplary embodiment of the consolidation and decommissioning analytics described herein, a description of an exemplary access network 200 is provided below.

FIG. 2 is an exemplary diagram of network 200. As illustrated, in this example, network 200 occupies a Local Access and Transport Area (LATA) 205. LATA 205 may be a geographical area serviced by local exchange carriers (LECs), such as an incumbent local exchange carrier (ILEC) and a competitive local exchange carrier (CLEC). It is common practice for a CLEC to lease network resources of the ILEC's network and interconnect their own network resources with the ILEC's network. As further illustrated, network 200 includes network resources, such as hubs 210-1 through 210-X, in which X>1 (referred to collectively as hubs 210 and individually as hub 210), entrance facilities (EFs) 215-1 through 215-Y, in which Y>1 (referred to collectively as entrance facilities 215 or individually as entrance facility 215), and circuits 220-1 through 220-Z, in which Z>1 (referred to collectively as circuits 220 or individually as circuit 220). Although not illustrated, network 220 may include riders. By way of example, a rider is a circuit that "rides" on a higher bandwidth, such as a DS1 circuit that rides on a DS3 circuit. According to other embodiments, network 200 may not occupy a LATA. Additionally, or alternatively, according to other embodiments, network 220 may include additional, fewer, and/or different network resources.

Figure 3A:
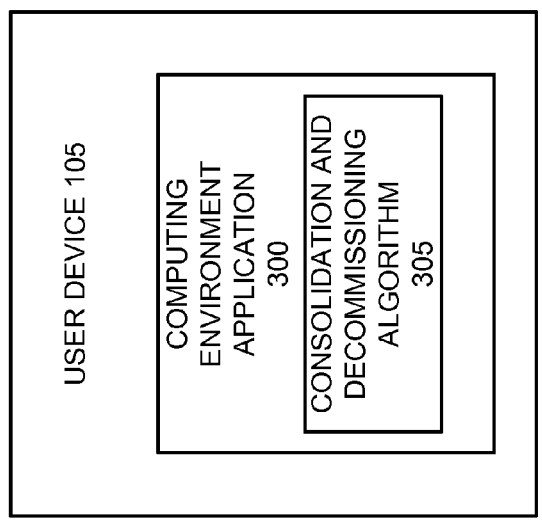
FIG. 3A is a diagram illustrating an exemplary user device.

FIG. 3A is a diagram illustrating an exemplary user device 105. As illustrated, user device 105 includes a computing environment application 300. Computing environment application 300 includes a consolidation and decommissioning algorithm 305.

Computing environment application 300 provides a modeling environment. Within the modeling environment, a user performs simulations pertaining to a network. According to an exemplary embodiment, computing environment application 300 permits the user to simulate the consolidation and decommissioning of network resources associated with a network. Computing environment application 300 includes consolidation and decommissioning algorithm 305 that provide the consolidation and decommissioning analytics.

According to an exemplary embodiment, the analytics include minimizing monetary cost (e.g., the total cost). As previously described, for example, the consolidation and decommissioning of network resources may pertain to leased network resources. According to such an example, consolidation and decommissioning algorithm 305 accounts for monetary penalties, if any, associated with the consolidation and/or decommissioning of a network resource (e.g., a hub, an entrance facility, etc.), and the monetary expenditures associated with network resources.

According to an exemplary embodiment, demands associated with network resources (e.g., entrance facilities, circuits, etc.) are moved to other network resources to optimize utilization and minimize cost. According to an exemplary embodiment, the analytics use break-even periods as a basis to simulate moves. According to an exemplary implementation, a break-even period corresponds to a time period (e.g., in terms of months) within which the penalty for decommissioning a network resource will be recovered by the savings from the reduced monthly recurring costs.

According to an exemplary embodiment, a network resource move (e.g., a circuit move, etc.) does not trigger the creation of a new (bandwidth shared) entrance facility. According to another exemplary embodiment, a network resource move triggers the creation of a new network resource (e.g., a new entrance facility, etc.). According to an exemplary implementation, the decision to create or not create a new network resource is based on a set of business rules. Additionally, according to an exemplary embodiment, a zero transport circuit (e.g., a circuit without a subtend) can be subtended to a non-optimal hub (e.g., non-optimal in terms of cost) to permit the consolidation and/or decommission of the circuit's existing serving hub.

Computing environment application 300 provides various user interfaces to permit user interaction. For example, a user may target a particular network resource (e.g., a hub, an entrance facility, etc.) for decommissioning. Alternatively, a user may target a particular network resource to exclude from decommissioning.

As described further below, computing environment application 300 operates based on various types of data, information, and user inputs. For example, the data, information, and user inputs, also referred to as consolidation and decommissioning information, may include costs associated with parent/child circuits (e.g., a DS1 on a DS3, a DS0 on a DS1, etc.), spare capacities (e.g., extra network resources), subtending costs (e.g., costs associated with additional network resources used to reach an end customer due to a consolidation), break-even information, lease rules and penalty information (e.g., disconnecting before a contract term expires, etc.), maximum utilization information (e.g., user input thresholds pertaining to use of network resources), decommissioning rules (e.g., rules governing the decommissioning of network resources), LEC hubbing rules (e.g., rules governing hub transit across the LEC network), and excluding information (e.g., user inputs to exclude network resources from decommission).

In some instances, consolidation and decommissioning information may be imperfect. For example, information pertaining to network resources that are billed (e.g., to customers) vis-à-vis information pertaining to network resources used by the network may not match. According to an exemplary embodiment, computing environment application 300 permits, for example, a user to replace mismatched, blocked and/or unknown active network resources with "worst case" information.

Figure 3B:
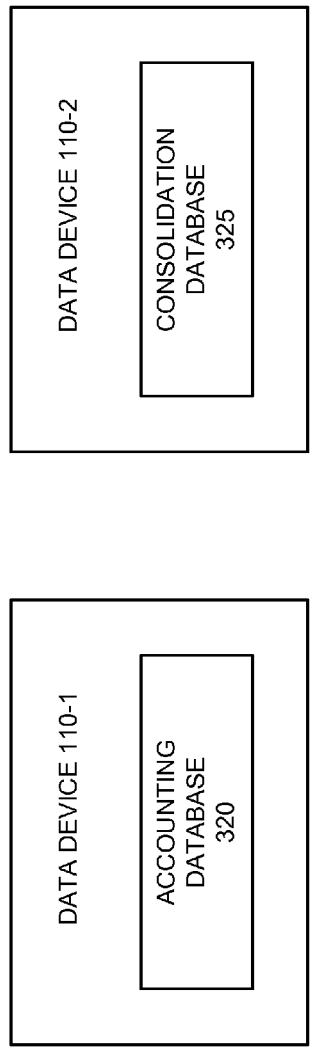
FIG. 3B is a diagram illustrating exemplary databases associated with data devices.

FIG. 3B is a diagram illustrating exemplary databases associated with data devices 110. As illustrated, data device 110-1 includes an accounting database 320 and data device 110-2 includes a consolidation database 325. According to other implementations, data device(s) 110 may include additional databases, fewer databases, and/or different databases than those illustrated and described herein.

Accounting database 320 includes financial information (e.g., customer billing information) associated with capacity that is purchased.

Consolidation database 325 includes various types of data and/or information. For example, consolidation database 325 includes network element information (e.g., hubs, entrance facilities, circuits, etc., associated with a network), network configuration information including cross-connect information (e.g., associated with ILEC network resources) and parent/child relationships, and network resource cost information (e.g., cost of each leased network resource, cross-connect costs, multiplexing costs, de-multiplexing costs, transport costs, subtending costs, etc.).

Consolidation database 325 includes rules information. For example, rules information includes contract information (e.g., lease contract information, penalty information (e.g., disconnection before contract term), etc.), and decommissioning rules (e.g., rules pertaining to decommissioning of network resources). According to an exemplary embodiment, consolidation database 325 includes rules pertaining to the adding of new network resources.

Consolidation database 325 includes statistical information pertaining to the usage of network resources. For example, with reference to a hub, the statistical information includes the number of entrance facilities, the number of riders, the number of open channels, and the percentage of use.

Consolidation database 325 may include other types of data and/or information, such as, break-even, spare capacity, maximum utilization, forced decommissions of network resources, and/or excluded decommissions of network resources. Alternatively, one or more of this type of data and/or information may be user inputs associated with user interactivity with computing environment application 300.

Figure 3C:
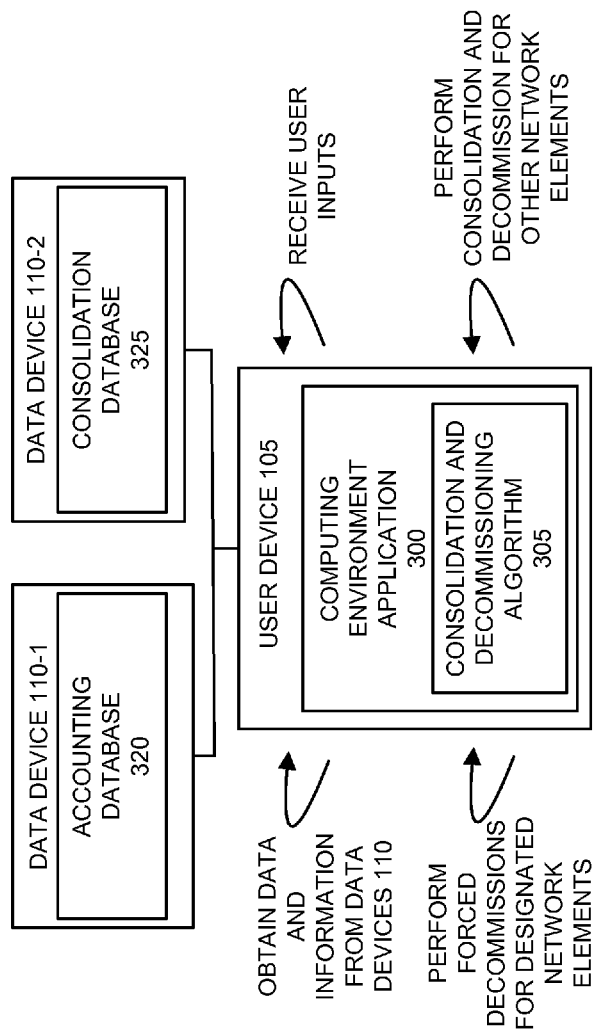
FIG. 3C is a diagram illustrating an exemplary process pertaining to an exemplary embodiment of a consolidation and decommissioning algorithm.

FIG. 3C is a diagram illustrating an exemplary process pertaining to an exemplary embodiment of a consolidation and decommissioning algorithm. As illustrated, user device 105 (e.g., computing environment application 300) obtains the data and information from data devices 110. By way of example, the data and information may include a list of hubs 210 in LATA 205 and any excluded hubs 210 and decommissioned hubs 210. If there is an excluded hub 210, then all entrance facilities 215 associated with excluded hub 210 are also excluded. According to an exemplary implementation, a hub 210 designated for exclusion provides that hub 210 is excluded from consolidation. According to another exemplary implementation, a hub 210 designated for exclusion provides that hub 210 is excluded from decommission. This ensures that at least one active entrance facility is maintained at that hub 210. If there is a decommissioned hub 210, then all entrance facilities 215 associated with decommissioned hub 210 are subject to decommissioning.

In the event of exclusion and/or decommission discrepancies, according to an exemplary implementation, such discrepancies are resolved based on network resource hierarchy. For example, assume that an entrance facility 215 is designated as an excluded entrance facility 215, but the excluded entrance facility 215 is associated with a designated decommissioned hub 210. According to this example, the designation of the hub 210 supersedes the designation of the entrance facility 215. Hub information includes statistical information (e.g., the number of entrance facilities, the number of riders, the number of channels available, etc.), the percentage of utilization, etc. If a hub 210 includes only a single entrance facility 215 and the single entrance facility 215 is not designated for decommission, according to an exemplary implementation, the entrance facility 215 is designated as being excluded. Consolidation and decommissioning algorithm 305 is capable of accessing and using all entrance facility information associated with entrance facilities 215 that terminate at any given hub 210.

The data and information may include a list of entrance facilities 215 in LATA 205. For example, the list may correspond to entrance facilities 215 for a multiplexer-level being considered. For example, if the consolidation and decommissioning pertains to DS3 entrance facilities 215, the list includes all of the DS3 Entrance Facility Access Capacity (EFAC) for LATA 205. In some cases, EFAC records may be flagged for exclusion. Entrance facility information includes recurring cost of the entrance facility 215 and penalty information for early termination. According to an exemplary implementation, a zero-mile entrance facility 215 (e.g., a circuit to a customer on a DS3 in which there are no miles to pay for on a DS1) includes cross-connect costs and multiplexer costs. However, a non-zero entrance facility 215 (e.g., a circuit billed at the DS1 rate) includes cross-connect costs, multiplexer costs, and transport costs. The entrance facility information includes statistical information (e.g., the number of channels in use, the number of channels available, the number of channels mismatched (e.g., between accounting database 320 and consolidation database 325), the percentage of utilization, costs, and contract information.

The data and information may include a list of all circuits 220 associated with each entrance facility 215. If an entrance facility 215 is excluded, every circuit riding that entrance facility 215 is also excluded. According to an exemplary implementation, circuit-level excludes may not be permitted.

Figure 11:
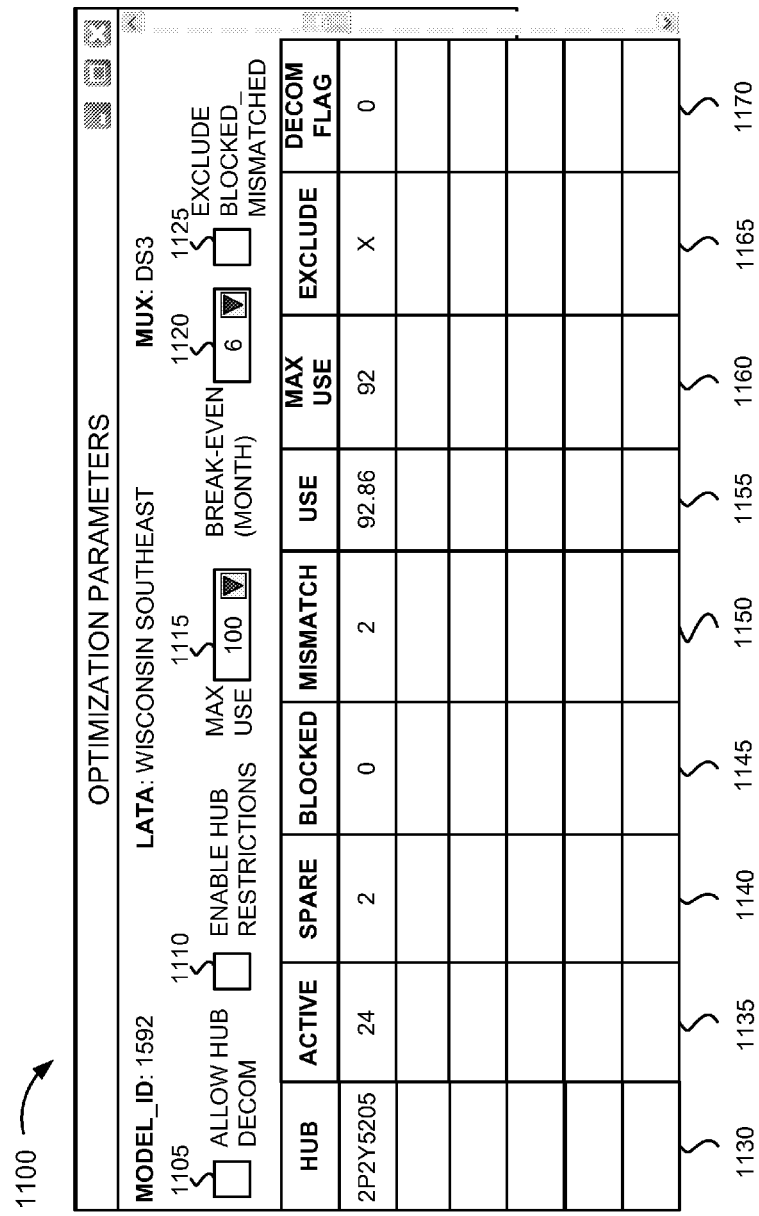
FIG. 11 is a diagram illustrating an exemplary user interface of a consolidation and decommission setting screen.

User device 105 may also receive user inputs, such as break-even, spare capacity, maximum utilization, forced decommissions of network resources, and/or excluded decommissions of network resources. For example, as illustrated in FIG. 11, an exemplary user interface 1100 is configured to receive various user inputs. For example, a user-selectable item 1105 permits a user to select whether hub decommission is allowed. A user-selectable item 1110 permits a user to enable hub restrictions (e.g., use LEC-mandated hubbing restrictions while performing consolidation). A user-selectable item 1115 permits a user to set a maximum use for a network resource (e.g., a hub, an entrance facility, etc.). A user selectable item 1120 permits a user to set a break-even value and a user-selectable item 1125 to exclude blocked mismatches between information from, for example, accounting database 320 and consolidation database 325. As illustrated, user interface 1100 includes a hub field 1130 that indicates an identifier of a hub, an active field 1135 that indicates the number of active channels served by the hub, a spare field 1140 that indicates the number of spare channels available, a blocked field 1145 that indicates the number of channels blocked for maintenance or pending install, a mismatch field 1150 that indicates the number of channels that mismatch between the billing information (e.g., accounting database 320) and the consolidation information or use information (e.g., consolidation database 325), a use field 1155 that indicates the use of the hub (e.g., based on statistical information), a maximum use field 1160 that indicates a maximum usage permitted for the hub, an exclude field 1165 that indicates whether to exclude the hub from consolidation, and a decommission flag field 1170 that indicates whether the hub is selected for decommission.

Figure 3D:
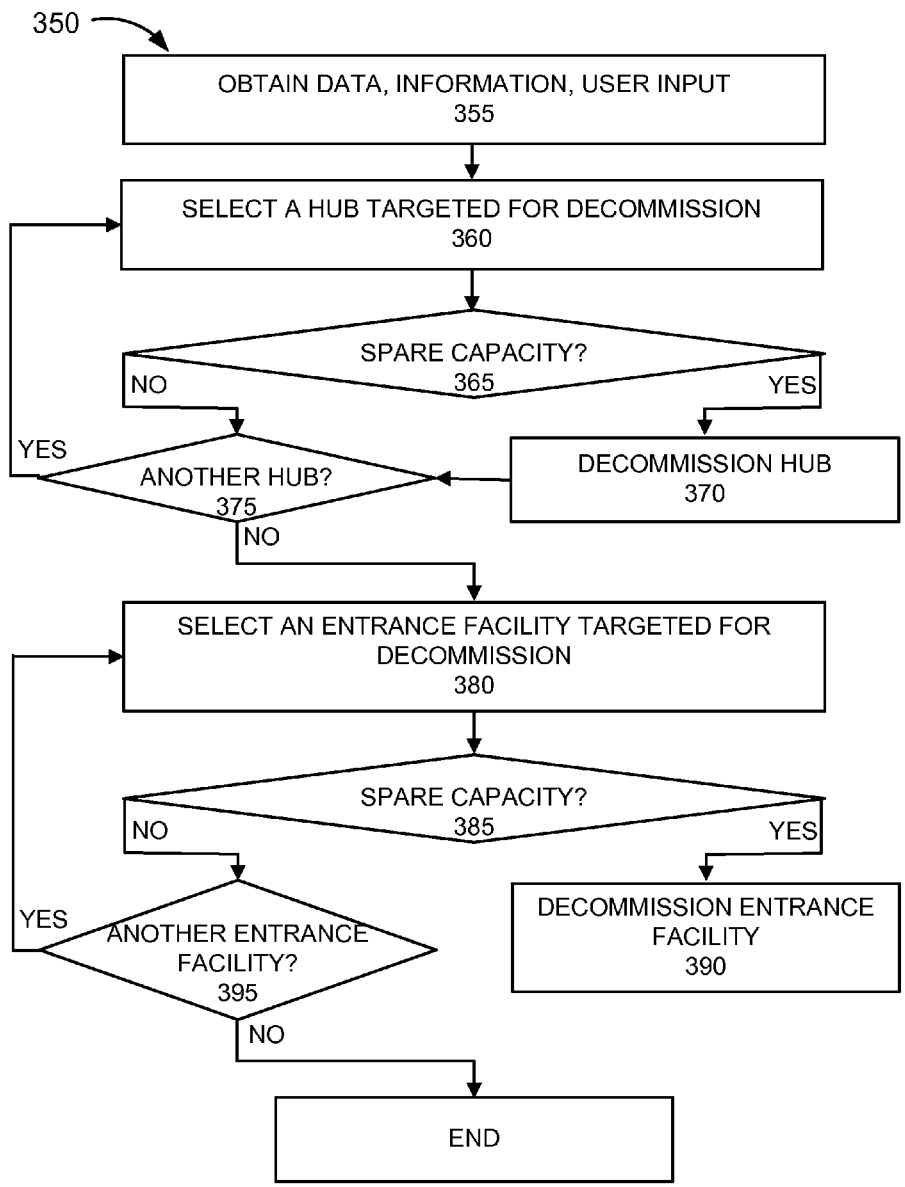
FIG. 3D is a flow diagram illustrating an exemplary process pertaining to forced decommission of hubs and entrance facilities.

Based on data, information, and/or user inputs obtained, according to an exemplary process, consolidation and decommissioning algorithm 305 forces the decommissioning of network resources selected by a user. FIG. 3D is a diagram illustrating an exemplary process 350 pertaining to forced decommission of hubs and entrance facilities. According to an exemplary embodiment, process 350 is performed by user device 105. For purposes of description of process 350, it is assumed that there is at least one hub and at least one entrance facility targeted for decommission.

In block 355, data, information, and user inputs are obtained. For example, as previously described, user device 105 obtains data and information from data device(s) 110 that stores databases (e.g., accounting database 320 and consolidation database 325). According to an exemplary implementation, a user designates, via a user interface, at least one hub and at least one entrance facility for decommission.

In block 360, a hub targeted for decommissioning is selected. For example, user device 105 identifies a hub that is designated for decommissioning.

In block 365, it is determined whether there is spare capacity to decommission the targeted hub. For example, during a simulation, user device 105 attempts to move the demands associated with the hub (e.g., associated with all entrance facilities at that hub) to other network resources (e.g., to alternate hubs) in the network. For example, user device 105 attempts to move entrance facilities and riders associated with the hub. According to an exemplary embodiment, the movements are performed without regard to cost. In this way, there is a determination as to whether there is sufficient spare capacity in the network to decommission the hub. According to an exemplary implementation, with reference to riders, user device 105 attempts to move a rider to a destination hub. If there is no spare capacity with the destination site, user device 105 may subtend the rider from an optimal hub. Additionally, according to an exemplary implementation, riders will not be moved from a hub (or entrance facility) to another hub (or entrance facility) that is designated for decommission, unless that hub (or entrance facility) cannot be decommissioned.

As previously described, according to an exemplary embodiment, user device 105 does not create new network resources to allow for the decommissioning of a network resource (e.g., a hub, etc.). According to another exemplary embodiment, user device 105 allows for the addition of new network resources to allow for the decommissioning of a network resource. According to an exemplary implementation, the adding of new network resources is based on business rules that pertain to, among other parameters, added cost and utilization of added network resource. A method and an algorithm for adding new network capacity that may be used is described in U.S. application Ser. No. 12/178,165, filed Jul. 23, 2008, the disclosure of which is hereby incorporated by reference herein in its entirety.

If it is determined that there is spare capacity to decommission the targeted hub (block 365-YES), then the targeted hub is decommissioned (block 370). For example, if user device 105 is able to simulate moves to allow for the decommissioning of the hub, then user device 105 stores simulation data (e.g., moves, etc.) that provides for the decommissioning of the hub. In other words, to decommission a hub, every entrance facility on that hub will be decommissioned, with all of their riders moved to other entrance facilities, at other hubs.

If it is determined that there is not spare capacity to decommission the targeted hub (block 365-NO), then it is determined whether there is another hub to decommission (block 375). For example, if user device 105 is unable to simulate moves to allow for the decommissioning of the hub, then user device 105 stores simulation data pertaining to the failure of decommissioning the hub. If there is another hub (block 375-YES), then process 350 continues to block 360. For example, if user device 105 identifies another hub designated to decommission, then user device 105 attempts to simulate moves to allow for the decommissioning of the hub. If there is not another hub (block 375-NO), then an entrance facility targeted for decommission is selected (block 380). For example, if user device 105 is unable to identify any further hubs to decommission, then user device 105 selects an entrance facility, designated by the user, to decommission.

In block 385, it is determined whether there is spare capacity to decommission the targeted entrance facility. For example, similar to that previously described with reference to a hub, user device 105 attempts to move the demands associated with the entrance facility to other network resources in the network. In this case, demands can be moved to other entrance facilities within the same hub that are either not targeted for decommissioning, or yet to be considered for decommissioning. For example, user device 105 attempts to move circuits and riders associated with the entrance facility. According to an exemplary embodiment, the movements are performed without regard to cost. In this way, there is a determination as to whether there is sufficient spare capacity in the network to decommission the entrance facility.

If it is determined that there is spare capacity to decommission the targeted entrance facility (block 385-YES), then the targeted entrance facility is decommissioned (block 390). For example, if user device 105 is able to simulate moves to allow for the decommissioning of the entrance facility, then user device 105 stores simulation data (e.g., moves, etc.) that provides for the decommissioning of the entrance facility.

If it is determined that there is not spare capacity to decommission the targeted entrance facility (block 385-NO), then it is determined whether there is another entrance facility to decommission (block 395). If there is another entrance facility (block 395-YES), then process 350 continues to block 380. If there is not another entrance facility (block 395-NO), then process 350 ends.

According to an exemplary embodiment, consolidation and decommissioning algorithm 305 provides for the consolidation and decommissioning of network resources that have not been designated for decommissioning nor excluded from decommissioning. Exemplary pseudo code of an exemplary embodiment of the algorithm is provided below and is further described with respect to flow diagrams 4A-4C. The pseudo code includes comments pertaining to the pseudo code.

```
For each HUB that is not targeted for forced decommissions and not flagged for exclusion:
        /* Hubs can be sorted based on the number of active circuits that are incident upon it.
        ** Thus the fewer the circuits, the higher it is on a list.
      ** Alternatively, the EFs can be sorted directly based on how profitable they are using
      ** the calculation below.
      **The array EF.rider_cost[ ] gives the cost of each rider on an EF.
      ** EF.Total_Cost = Cost of the EF + Cost of the riders on it;*/
      Calculate the break-even of each EF;
      EF.BE (Months) := EF.MTL_Penalty ($) / EF.Total_Cost ($/Month).
      Sort the EF based on the EF.BE in ascending order.
      If an EF.BE > Break-even required, this EF is skipped.
For (each EF on this Hub) {
        If (EF is a candidate for consolidation) {
        /* That is, the EF is not marked for exclusion and its break-even meets user criteria.
        **First initialize a temporary array of counters associated with the hubs.*/
             For (each hub j) {
                   optimal_hub[j] := 0;
             }
             Do_Move := 0; /* A flag that indicates if the moves can be carried out */
             Simulate (Unload the EF):
        Create a temporary work area in memory to track the various moves;
        To_Move := # of riders on this EF;
        Spares:= Total Spares at this HUB;
        Cur_Spares := Spares - EF.Spares;
        Cur_EF_Total_Cost := EF.Total_Cost; /*Total current cost for the EF */
        /* Identify the list of riders that can be moved to their optimal hubs.*/
        For (each rider j on the EF) {
             /* If it can be moved to its optimal HUB @ $0 cost */
             Opt_Hub := get_optimal_hub(EF.rider[j]);
             If (Opt_Hub) {
                   Cur_EF_Total_Cost := Cur_EF_Total_Cost - EF.rider_cost[j];
                   optimal_hub[Opt_Hub].reserved += 1;
                   To_Move := To_Move - 1;
                   Mark_Rider( ); /* Mark this rider as already being processed */
                   }
        }
        /* If all the riders have been marked, then completed.*/
        If (To_Move == 0) {
             Do_Move := 1;
             End Simulate;
        }
      If (To_Move) {
      /* There are riders to move;
      ** Two alternatives:
      ** 1: Are there spare channels on other EFs within the same HUB?
      ** 2: Is there an alternate, closest HUB where capacity exists, but which will
      ** result in some additional cost (residual cost)
      **
      ** Identify if all of the remaining riders can be moved to spares within the
      ** HUB. If not, then calculate subtending costs for those riders that cannot be
      ** moved directly. This could affect whether the EF can be decommissioned.*/
```

```
        If ((Cur_Spares – To_Move ) >= 0) {
                /* All riders can be accommodated. */
                Cur_Spares := Cur_Spares – To_Move;
                Do_Move := 1;
                Mark all riders as assigned for moves;
                Return: Simulate;
        }
        Else {
        /* Not all riders can be accommodated. Some riders will need to
        ** subtend from a sub-optimal HUB. This can increase its cost.
        ** Hence for these riders calculate its added contributions and
        ** its effect on the break-even value. This will decide if the EF
        ** can be consolidated.*/
        To_Subtend := To_Move – Cur_Spares;
        Subtend_Count := 0;
        Subtend_Cost := 0;
                For (each rider j not yet assigned a move) {
                        Opt_Hub := get_optimal_hub(EF.rider[j]);
                        Opt_Cost := cost of subtending from the optimal hub;
                        If (Opt_Hub is null) {
                        /* Alternate Hub does not exist */
                        Opt_Cost = INFINIT;
                        Do_Move:=0;
                        Return Simulate;
                        }
                        Else {
                        Opt_Cost = subtending cost;
                        Subtend_Count += 1;
                        }
                                EF.rider[j].min_cost = Opt_Cost;
                        }
                        /* Order the riders by their smallest min_costs;*/
                        If (Subtend_Count < To_Subtend) {
                        /* Not enough subtending riders exist to fully unload the EF*/
                                Do_Move := 0;
                                Return Simulate;
                        }
                Subtending_Cost := (Sum of the min_costs for the first (To_Move – Cur_Spares)
                riders on EF, in the sorted list of unassigned riders.
                Subtending_Riders_Cost = Sum of EF.rider_cost[ ] for all the riders that will subtend.
                /* Determine if the cost of subtending the circuits is prohibitively expensive*/
                If (Subtending_Cost – Subtending_Riders_Cost > EF.Total_Cost) {
                        EF_BE := INFINIT;
                        Do_Move := 0;
                        Return: Simulate;
                }
        Else {
        /* Calculate the new break-even and see if it still meets the criteria*/
        EF_BE := EF.MTL_Penalty / (EF.Total_Cost – Subtending_Riders_Cost
                    + Subtending_Cost).
            If (EF_BE <= Break-even) {
                        Do_Move := 1;
                    For (each rider j to subtend) {
                    Opt_Hub = get_optimal_hub(EF.rider[j]);
                      optimal_hub[Opt_Hub].reserved += 1;
                    To_Move := To_Move – 1;
                    Mark_Rider( );
                    }
            /* Next mark the remaining riders as being moved to spare channels
            ** on other entrance facilities within the same HUB*/
                    For (each rider j yet to be marked) {
                    Mark_Rider( );
                    }
        }
            Else {
            Do_Move := 0;
            }
            Return: Simulate;
            }
        }
} /* End if (To_Move) */
        End: Simulate;
        }
            /* This is the end of the simulation. If Do_Move := 1, then move the
            ** riders to their respective assigned routes and then decommission the EF*/
        If (Do_Move) {
                    move_riders_to_optimal_hub(EF);
                    if subtending is necessary:
                            move_riders_to_subtends(EF);
```

```
                move_riders_to_EFs_within_HUB(EF);
                mark_EF_to_decommission(EF);
            }
            Else {
                mark_EF_as_available(EF);
            }
            free_temporary_memory( );
            reinitialize_variables( );
        } /* End if (EF is a candidate for consolidation) */
    } /* End For (each EF on this HUB) */
} /* End For (that is not targeted for forced decommissions and not flagged for exclusion)*/
Generate_Reports( );
```

The exemplary pseudo-code expressed above includes exemplary functions. A description pertaining to functions used in the pseudo-code is provided below.

move_riders_to_optimal_hub(EF)

For every rider on the EF, its optimal HUB is identified. If capacity exists, the rider is moved to its optimal HUB. That is, at this optimal HUB for the rider, there exists an EF with a spare channel to support this rider.

Update the new EF at the optimal HUB for the rider, to which this rider is moved, which includes to:
    decrement the available spare capacity for this target EF;
    decrement the available spare capacity at the optimal HUB for the rider;
    increment the # of riders on this target EF;
    increment the # of riders at the optimal HUB for the rider; and
    do not change the total cost of the target EF since the cost of the rider is $0.
  Update the rider with its new Circuit Facility Assignment (CFA);
  Update the rider cost;
  Track the cost of the rider after its migration;
  Update the new_total_cost of the EF (after the migration of this rider). The new cost will track the cost of the riders in their new CFA, and assign it against the originating EF.
  This will allow to compare the impacts of decommissioning the EF and calculate its break-even accurately.

move_riders_to_subtend(EF)

If some of the riders need to be subtended, then these riders are identified and moved. After the subtends are done, the remaining riders are moved to other EFs within the same HUB.

Identify the number of riders that need to be moved as subtends;
  From the sorted list of riders that are yet to be moved, arranged in the ascending order of their subtending costs, pick each rider to move:
    move rider to its reserved HUB with available capacity;
    /*In selecting the spare channel amongst the EFs at the target HUB, according to
    ** an exemplary implementation, an EF that is not a candidate for
    **decommissioning, or an EF that has already been considered but not
    **decommissioned is selected*/
    update the spares on that target EF;
    update the spares at the target HUB;
    update the rider_cost for the target EF;
    update the total_cost for the target EF;
    update the new_total_cost of the EF (to reflect the residual cost of the moved rider); and
    mark the rider as moved.

move_riders_to_EFs_within_HUB(EF)

Riders are moved to available channels within the same HUB, but on a different EF. Once all subtending riders have been taken care of, the remaining riders on the EF are moved to other spare channels within the HUB.

Identify a suitable, alternate EF on this HUB, with capacity to support the riders. Select the EFs in the following order: EFs that will not be decommissioned, EFs that are lowest on the list for decommissioning;
  Move the riders to the alternate channel:
    update the spares on that target EF;
    update the spares on the HUB;
    update the rider_cost for the target EF;
    update the total_cost for the target EF;
    update the new_total_cost of the EF (to reflect the residual cost of the moved rider); and
    mark the rider as moved mark_entrance_facility_to_decommission(EF)

EF is marked for decommissioning.
  Flag the EF as decommissioned;
  Update the spares at the HUB;
  Set EF.BE=EF.MTL_Penalty/EF.new_total_cost; and
  Set EF.Effective_Monthly_Savings=EF.Total_Cost−EF.New_Total_Cost.

Generate_Reports( )

Provides reports and data/information pertaining to the execution of the HEFC algorithm including the following:
  1) Incumbent cost of the current EFs.
  2) Total Incumbent cost of the EFs that are active after customer exclusions.
  3) Total number of EFs consolidated.
  4) Total penalty incurred for the EFs being consolidated.
  5) Contribution to the Total Recurring Monthly (TRM) costs of these consolidated EFs. This is the contribution of the individual riders on the EFs that now bill recurring costs each month for their transport
  6) Channel Grooms Threshold value (e.g., threshold space capacity for a network resource).
  7) Maximum Utilization value.
  8) Number of mismatched circuits.
  9) Number of blocked circuits.
  10) Break-even value (e.g., in months).
  11) Number of initial HUBs.
  12) Initial number of EFs.
  13) Number of forced HUBs to decommission.
  14) Number of decommissioned HUBs.
  15) Number of decommissioned EFs.
  16) Pre-optimization cost of EFs.
  17) Pre-optimization cost of EFs (not excluded).
  18) Post-optimization cost of EFs.

19) Monthly Term Lease (MTL) penalty of consolidated EFs.

20) Total savings of consolidated EFs (e.g., monthly recurring).

21) Pre-optimization cost of the riders.

22) Post-optimization cost of the riders.

23) Riders cost difference.

24) Cost of unknown circuit moves.

25) Cost of blocked/mismatched circuit moves.

26) Effective savings (e.g., monthly recurring).

27) Effective break-even for the consolidation plan: (Total penalty incurred during the consolidation)/(Total effective monthly recurring savings); for example, in months.

28) Decommissioned HUBs.

29) An EF Consolidation Report provides information pertaining to each EF that is being recommended for consolidation. For example, a summary is provided, at the EF-level, that includes the current recurring cost, new recurring cost, effective monthly recurring cost savings, penalty incurred, and break-even.

30) A Circuit Moves Report that provides the circuit moves for the riders of the consolidated EFs.

31) An EF Utilization Report that provides a list of each EF that remains post-consolidation. The EF Utilization Report includes summaries pertaining to pre-consolidation and post-consolidation, in which the summaries include, for example, # of channels used, # of channels available, and percentage of utilization).

Figure 4A:
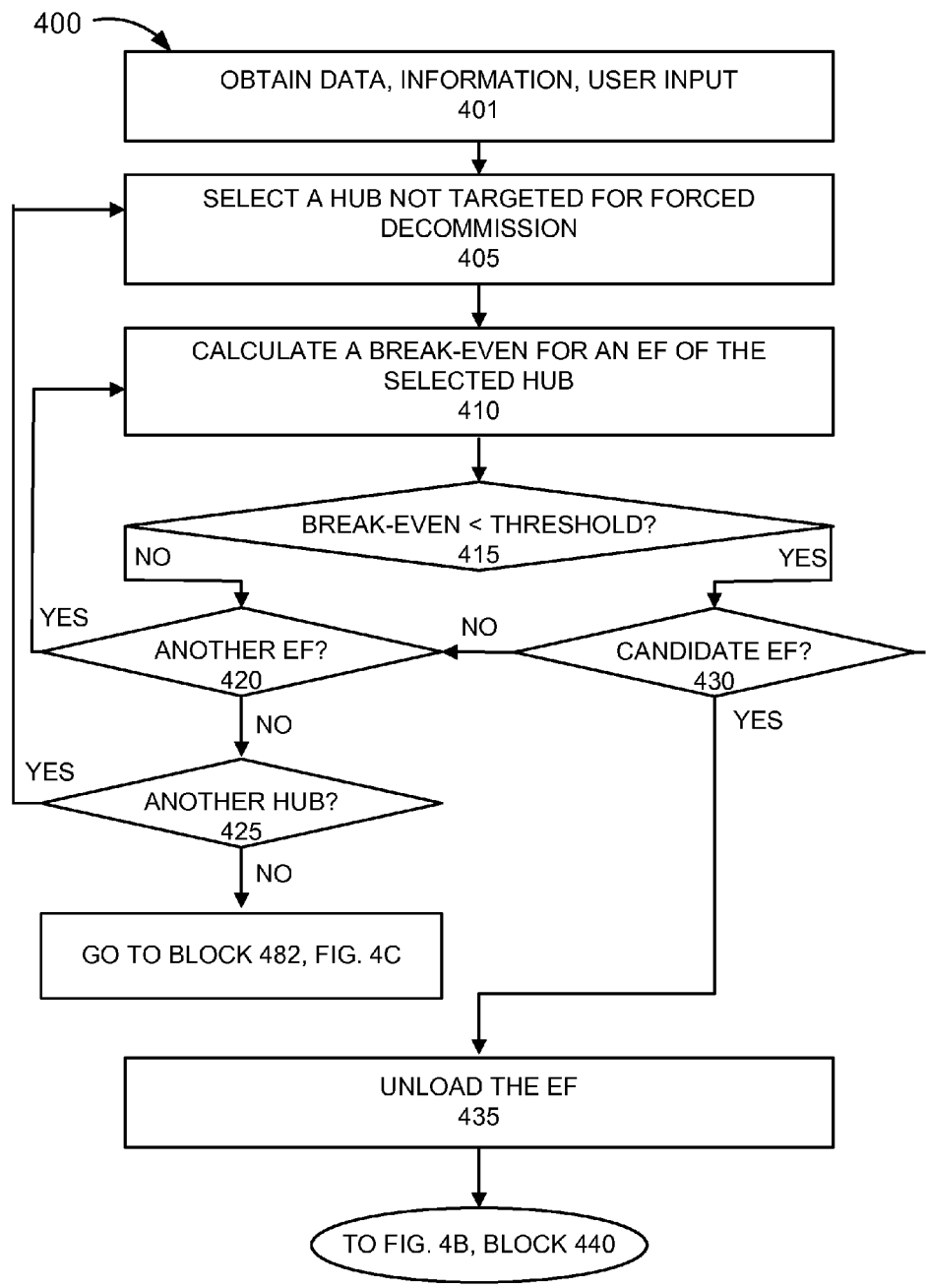
FIGS. 4A-4C are flow diagrams illustrating another exemplary process pertaining to an exemplary embodiment of a consolidation and decommissioning algorithm.
Figure 4B:
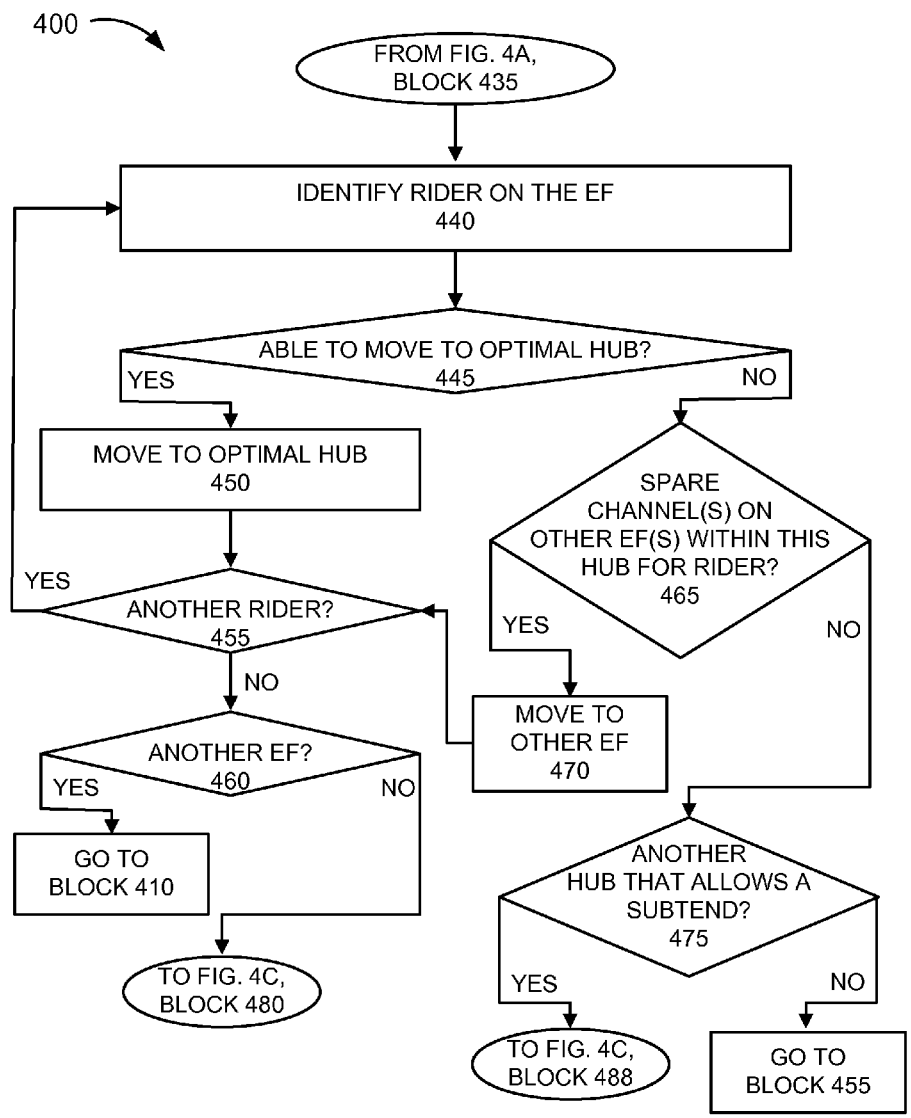
Figure 4C:
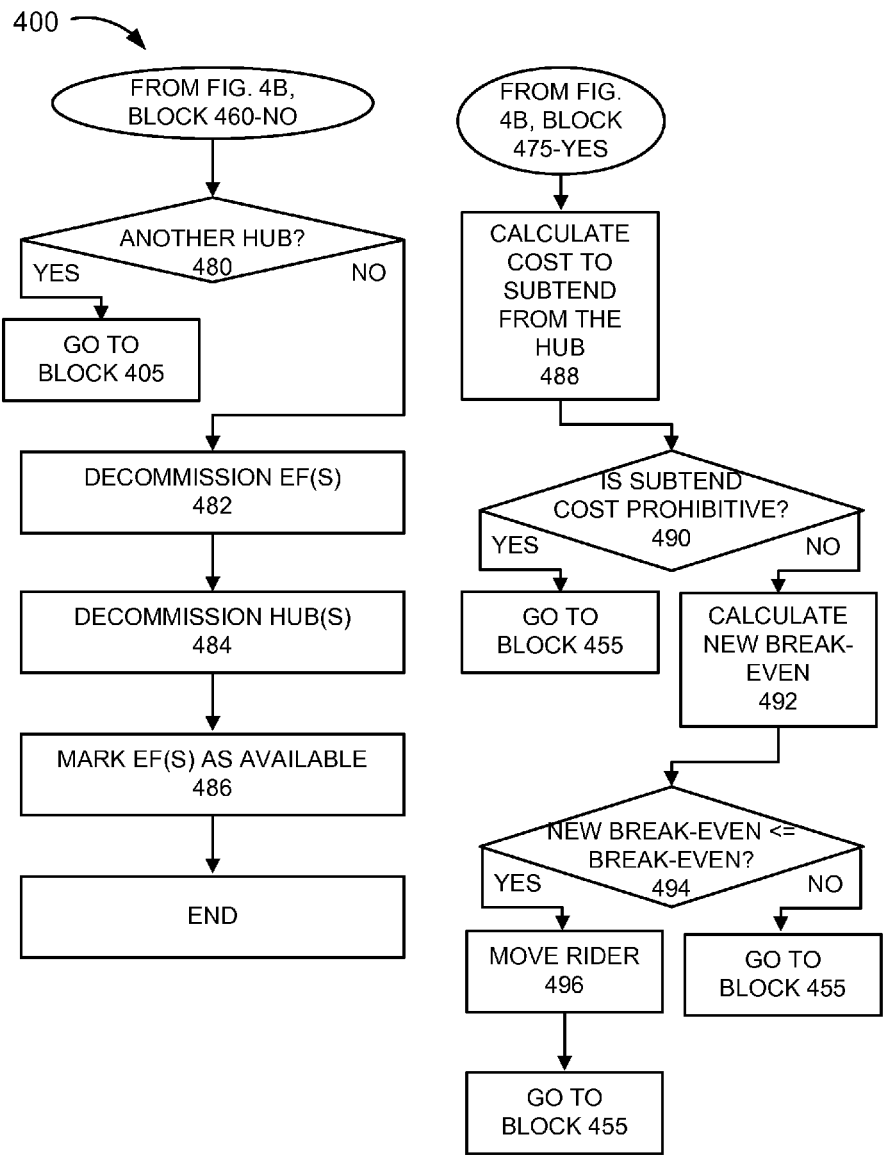

FIGS. 4A-4C are flow diagrams illustrating another exemplary process 400 pertaining to the consolidation and decommissioning algorithm 305. According to an exemplary embodiment, process 400 is performed by user device 105. Process 400 is based on the pseudo code described above.

In block 401, data, information, and user inputs are obtained. For example, user device 105 obtains data, information, and user inputs from data device(s) 110 and a user.

In block 405, a hub that is not targeted for forced decommission is selected. For example, user device 105 identifies a hub not designated for decommission, based on the obtained data, information, and user input.

In block 410, a break-even is calculated for an entrance facility of the selected hub. For example, user device 105 calculates a break-even value for an entrance facility of the selected hub that is based on lease penalty information and total cost of the entrance facility over a particular time period.

In block 415, it is determined whether the break-even value is less than a threshold value. For example, user device 105 compares the break-even value to a break-even threshold value. The user may set a break-even threshold value that indicates a minimum break-even value to permit consolidation and/or decommissioning. As an example, if penalty information (e.g., early termination of lease) indicates a high cost, then the break-even value may be high and not (monetarily) suitable for consolidation and/or decommissioning.

If it is determined that the break-even is not less than the threshold (block 415-NO), then it is determined whether there is another entrance facility (block 420). If there is another entrance facility (block 420-YES), then process 400 continues to block 410. If there is not another entrance facility (block 420-NO), then it is determined whether there is another hub (block 425). If it is determined that there is another hub (block 425-YES), then process 400 continues to block 405. If there is not another hub (block 425-NO), the process 400 continues to block 482 illustrated in FIG. 4C, and described below.

If it is determined that the break-even is less than the threshold (block 415-YES), then it is determined whether the entrance facility is a candidate entrance facility (block 430). For example, user device 105 identifies whether the entrance facility is not marked for exclusion.

If it is determined that the entrance facility is not a candidate entrance facility (block 430-NO), then process 400 continues to block 420, as described above. If the entrance facility is a candidate entrance facility (block 430-YES), then the entrance facility is unloaded (block 435). For example, user device 105 simulates move(s) of the entrance facility to an optimal hub(s). For example, an optimal hub may be a hub in which the entrance facility may be moved at zero cost or may provide monetary savings.

Referring to FIG. 4B, in block 440, a rider is identified. For example, the entrance facility may be associated with one or more riders. User device 105 identifies a rider associated with the entrance facility. It is determined whether the rider can be moved to an optimal hub (block 445). For example, it is determined whether the rider can be moved with zero cost or cost savings. If it is determined that the rider can be moved to an optimal hub (block 445-YES), then the rider is moved to an optimal hub (block 450). For example, user device 105 simulates a move of the rider to the optimal hub. It is determined whether there is another rider associated with the entrance facility (block 455). If there is another rider (block 455-YES), then process 400 continues to block 440. If there is not another rider (block 455-NO), then it is determined whether there is another entrance facility associated with the selected hub (block 460). If there is another entrance facility (block 460-YES), the process continues to block 410. If there is not another entrance facility (block 460-NO), then it is determined whether there is another hub (block 480), as illustrated in FIG. 4C. If it is determined that there is another hub (block 480-YES), the process 400 continues to block 405.

If it is determined that there is not another hub (block 460-NO), then entrance facilities are marked as decommissioned (block 482). For example, user device 105 stores simulation data that indicates entrance facilities which no longer have circuits and riders based on the simulated movements.

In block 484, hubs are marked as decommissioned (block 484). For example, user device 105 stores simulation data that indicates hubs which no longer have entrance facilities based on the simulated movements.

In block 486, entrance facilities are marked as available (block 486). For example, user device 105 stores information pertaining to entrance facilities that have not been moved, but were considered. This information may be used during another iteration of process 400. Process 400 ends.

Referring back to FIG. 4B, if it is determined that the rider is not able to be moved to an optimal hub (block 445-NO), then it is determined whether there is/are spare channel(s) on other entrance facilities within this hub for the rider (block 465). For example, user device 105 identifies whether there is/are other entrance facilities (i.e., spare capacity) associated with the identified hub to accommodate the demands of the rider. If there is spare channel(s) on other entrance facilities within this hub (block 465-YES), then the rider is moved to the other entrance facility (block 470). For example, user device 105 consolidates the rider with the other entrance facility. Process 400 continues to block 455. If there is not spare channel(s) on other entrance facilities within this hub (block 465-NO), then it is determined whether there is another hub that allows a subtend for the rider (block 475). For example, user device 105 determines whether another hub is able to accommodate the demands of the rider. User device 105 also considers subtending the rider.

Referring to FIG. 4B, if there is not another hub that allows a subtend for the rider (block 475-NO), then process 400 continues to block 455. If there is another hub that allows a subtend for the rider (block 475-YES), then the cost to subtend from the identified hub to the other hub is calculated (block 488). For example, user device 105 calculates a subtending cost and a subtending rider cost.

In block 490, it is determined whether the subtend cost is prohibitive. For example, user device 105 compares the subtending cost and the subtending rider cost with the cost associated with the existing entrance facility. If it is determined that the cost is prohibitive (block 490-YES), the process 400 continues to block 455. For example, user device 105 calculates the existing cost associated with the rider and compares the existing cost with the subtending costs. If the existing cost is less than the cost to move the rider, then the subtending costs are determined to be prohibitive. If it is determined that the cost is not prohibitive (block 490-NO), then a new break-even is calculated (block 492). For example, user device 105 calculates the existing cost associated with the rider and compares the existing cost with the subtending costs. If the existing cost is greater than the cost to move the rider, then the subtending costs are determined not to be prohibitive. User device 105 calculates a new break-even value. For example, the new break-even value is based on the lease penalty information, total cost of the entrance facility, and subtending costs (e.g., subtending cost and subtending rider cost).

In block 494, it is determined whether the new break-even value is less than or equal to a threshold value. For example, user device 105 compares the new break-even value to a break-even threshold value. The user may set the break-even threshold value that indicates a minimum break-even value to permit the move.

If it is determined that the new break-even value is not less than the threshold value (block 494-NO), then the rider is not moved and process 400 continues to block 455. If it is determined that the new break-even value is less than the threshold value (block 494-YES), then the rider is moved (block 496) and the process continues to block 455. For example, user device 105 moves the rider to another entrance facility associated with the identified hub.

Although FIGS. 4A-4C illustrate an exemplary process pertaining to the consolidation and decommissioning of network resources of a network, according to other embodiments, process 400 may include additional operations, fewer operations, and/or different operations than those illustrated and described herein.

As previously described the simulation or execution of consolidation and decommissioning algorithm 305 outputs various reports. These reports may be viewed by the user. Additionally, the simulation data can be used to configure the network according to the consolidation and decommissions included therein. Described below are exemplary user interfaces provided by computing environment application 300.

FIGS. 5A and 5B are diagrams illustrating an exemplary user interface 500 of a consolidation summary report. The consolidation summary report provides information pertaining to consolidation and decommission of network resources. As illustrated, user interface 500 includes a description field 505, a value field 510, and an interactive element 515. Description field 505 includes summary information describing particular aspects of the consolidation and decommission. As illustrated in FIGS. 5A and 5B, description field 505 includes, among other types of information, the initial number of hubs, the initial number of entrance facilities, the number of hubs to decommission (e.g., user selected hubs), the number of decommissioned hubs, etc. Value field 510 indicates appropriate numerical values (e.g., the number of network elements, cost, etc.) relating to the descriptive information. Interactive element 515 permits a user to export the consolidation summary report to another application (e.g., a spreadsheet application, etc.) or format.

According to other implementations, user interface 500 may include additional fields, fewer fields, and/or different fields to provide additional, fewer, and/or different information and/or data.

FIG. 6 is a diagram illustrating an exemplary user interface 600 of a decommissioned hubs report. The decommissioned hubs report provides information pertaining to decommissioned hubs. As illustrated, user interface 600 includes a hub identifier field 605, a number of facilities field 610, a total effective cost field 615, a decommissioned request field 620, a decommissioned field 625, a cost after consolidation field 630, and a break-even field 635.

Hub identifier 605 includes an identifier for a hub that is decommissioned. Number of facilities field 610 indicates a number of entrance facilities that are decommissioned. Total effective cost field 615 indicates an operational cost to lease the entrance facilities.

Decommissioned requested field 620 indicates whether a user requested the decommissioning of the hub. For example, decommissioned request field 620 may indicate an "N" for no or a "Y" for yes. Decommissioned field 625 indicates whether the hub has been decommissioned. Cost after consolidation field 630 indicates projected operational costs associated with the entrance facilities. Break-even field 635 indicates a time period (e.g., weeks, months, etc.) after which monetary savings occur stemming from the decommissioning of the hub.

According to other implementations, user interface 600 may include additional fields, fewer fields, and/or different fields to provide additional, fewer, and/or different information and/or data.

FIG. 7 is a diagram illustrating an exemplary user interface 700 of a decommissioned facilities report. The decommission facilities report provides information pertaining to decommissioned entrance facilities. As illustrated, user interface 700 includes a circuit identifier field 705, a hub field 710, a total recurring cost field 715, a penalty field, a break-even field 725, an active field 730, a blocked field 735, a mismatch field 740, and a spare field 745.

Circuit identifier field 705 includes an identifier for a circuit that is decommissioned. Hub field 710 includes an identifier of a hub with which the decommissioned circuit is associated. Total recurring cost field 715 indicates the recurring operational costs associated with the circuit. Penalty field 720 indicates the monetary penalty associated with an early lease termination. Break-even field 725 indicates the break-even value. Active field 730 indicates the number of active channels carried by the circuit. Blocked field 735 indicates the number of channels blocked for maintenance or a pending installation. Mismatch field 740 indicates the number of channels that mismatch between the billing information (e.g., accounting database 320) and the consolidation information or use information (e.g., consolidation database 325). Spare field 745 indicates the number of unused channels associated with the circuit.

According to other implementations, user interface 700 may include additional fields, fewer fields, and/or different fields to provide additional, fewer, and/or different information and/or data.

FIG. 8 is a diagram illustrating an exemplary user interface 800 of a circuit moves report. The circuit moves report provides information pertaining to simulated circuit moves based on the consolidation and decommissioning analysis. In this example, the circuit moves report pertains to DS3 facilities that include DS1 circuits. As illustrated, user interface 800 includes a new circuit facility assignment (CFA) circuit identifier field 805, a new CFA field 810, an existing CFA field 815, a Circuit ID CRDW field 820, an Exchange Carrier Circuit Compressed Number (EC CCT CMPR NBR) field 825, an existing hub field 830, a from common language location identifier (CLLI) field 835, a to CLLI field 840, and a mileage field 845.

New CFA circuit identifier field 805 includes a new CFA circuit identifier for a DS3 entrance facility associated with the moved DS1 circuit. New CFA field 810 includes a new CFA identifier for the DS3 that is used by the ILEC. Existing CFA field 815 includes the existing CFA identifier. Circuit ID CRDW field 820 indicates an identifier of the child circuit (e.g., the DS1 circuit). EC CCT CMPR NBR field 825 indicates an identifier of the DS1 circuit used by the ILEC.

Existing hub field 830 includes an identifier of a hub associated with the circuit prior to the move of the circuit. From CLLI field 835 includes a CLLI identifier associated with the hub servicing the circuit prior to the move of the circuit. To CLLI field 840 includes a CLLI identifier associated with the hub servicing the circuit after the move of the circuit. Mileage field 845 includes a value indicating a distance between the hub of the From CLLI field 835 to the hub of the To CLLI field 840. In cases when the hubs are the same, the distance would be zero.

According to other implementations, user interface 800 may include additional fields, fewer fields, and/or different fields to provide additional, fewer, and/or different information and/or data.

Figure 9:
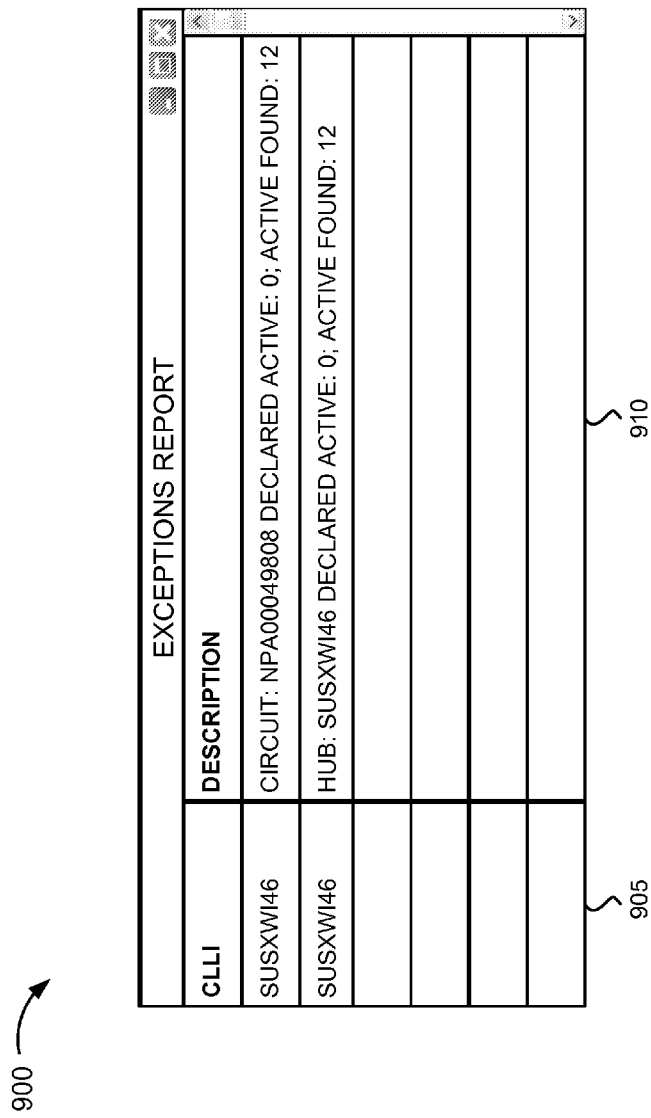
FIG. 9 is a diagram illustrating an exemplary user interface of an exceptions report.

FIG. 9 is a diagram illustrating an exemplary user interface 900 of an exceptions report. The exceptions report provides information pertaining to discrepancies between data and/or information stored in accounting database 320 and data and/or information stored in consolidation database 325. As illustrated, user interface 900 includes a common language location identifier (CLLI) field 905 and a description field 910. Common language location identifier field 905 may include a CLLI pertaining to a network resource, such as a hub 210, an entrance facility 215, a circuit 220, etc. Description field 910 may include information pertaining to a discrepancy or a mismatch.

According to other implementations, user interface 900 may include additional fields, fewer fields, and/or different fields to provide additional, fewer, and/or different information and/or data.

Figure 10:
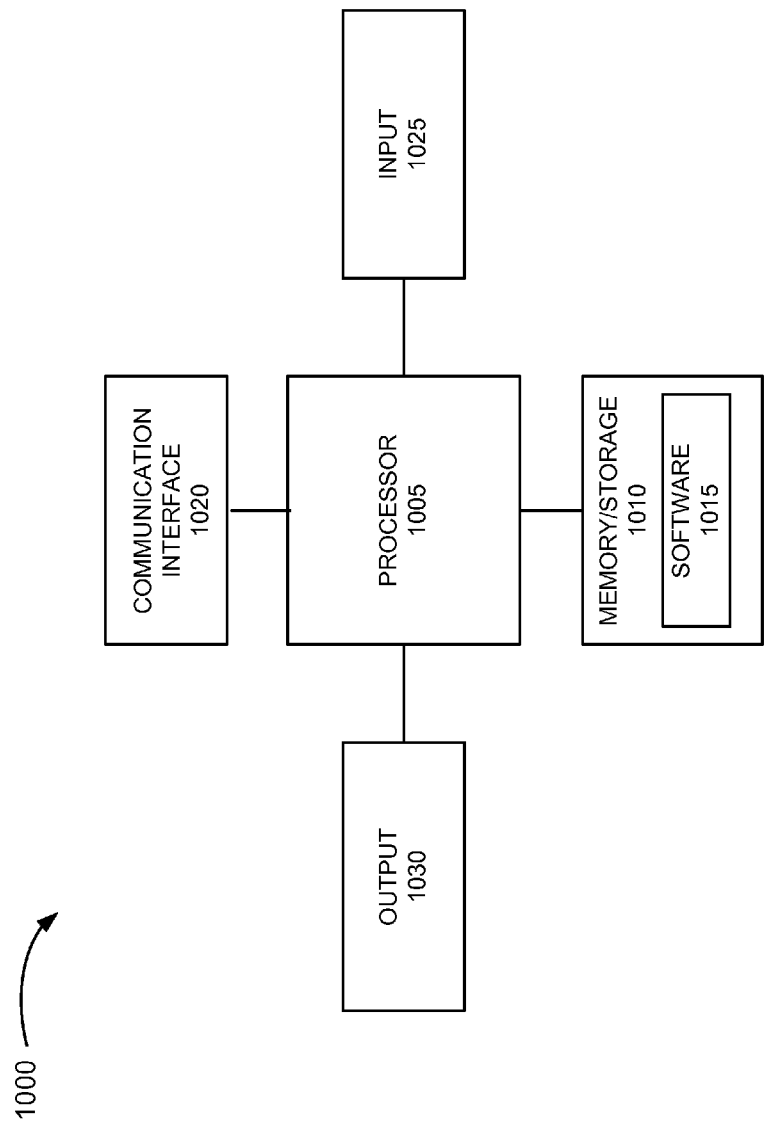
FIG. 10 is a diagram illustrating exemplary components of a device that may correspond to one or more devices described.

FIG. 10 is a diagram illustrating exemplary components of a device 1000 that may correspond to one or more of the devices in environment 100, network 200, and/or other devices illustrated and described herein. As illustrated, according to an exemplary embodiment, device 1000 includes a processor 1005, memory/storage 1010 including software 1015, a communication interface 1020, an input 1025, and an output 1030. According to other embodiments, device 1000 may include fewer components, additional components, different components, and/or a different arrangement of components than those illustrated in FIG. 10 and described herein.

Processor 1005 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 1005 may be implemented as hardware (e.g., a microprocessor, etc.), a combination of hardware and software (e.g., a SoC, etc.), may include one or multiple memories (e.g., memory/storage 1010), etc.

Processor 1005 may control the overall operation or a portion of operation(s) performed by device 1000. Processor 1005 may perform one or multiple operations based on an operating system and various applications and/or programs (e.g., software 1015). Processor 1005 may access instructions from memory/storage 1010, from other components of device 1000, and/or from a source external to device 1000 (e.g., a network, another device, etc.).

Memory/storage 1010 includes one or multiple memories and/or one or multiple other types of non-transitory storage mediums. For example, memory/storage 1010 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 1010 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 1010 may include drives for reading from and writing to the storage medium.

Memory/storage 1010 may be external to and/or removable from device 1000, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 1010 may store data, software, and/or instructions related to the operation of device 1000.

Software 1015 may include system software and, application software, and/or program(s) that provide various services and/or functions. For example, with reference to user device 105 and according to an exemplary embodiment, software 1015 includes an application that provides a computing environment that includes consolidation and decommissioning analytics, as described herein. Additionally, for example, with reference to data devices 110, software 1015 includes an application that manages the storing of data and/or information.

Communication interface 1020 permits device 1000 to communicate with other devices, networks, systems, etc. Communication interface 1020 may include one or multiple wireless interfaces and/or wired interfaces. Communication interface 1020 includes one or multiple transmitters, receivers, and/or transceivers. Communication interface 1020 may operate according to one or multiple protocols, communication standards, and/or the like.

Input 1025 permits an input into device 1000. For example, input 1025 may include a keyboard, a mouse, a microphone, a display, a touchpad, a touchscreen, a touchless screen, a button, a switch, an input port, speech recognition logic, and/or some other type of visual, auditory, tactile, etc., input component. Output 1030 permits an output from device 1000. For example, output 1030 may include a speaker, a display, a touchscreen, a touchless screen, a light, an output port, and/or some other type of visual, auditory, tactile, etc., output component.

Device 1000 may perform processes and/or functions, as described herein, in response to processor 1005 executing software (e.g., software 1015) stored by memory/storage 1010. By way of example, instructions may be read into memory/storage 1010 from another memory/storage 1010 or from another device via communication interface 1020. The instructions stored by memory/storage 1010 may cause processor 1005 to perform one or more processes described herein. Alternatively, for example, according to other implementations, device 1000 may perform one or more processes described herein based on the execution of hardware (processor 1005, etc.), the execution of hardware and firmware, or the execution of hardware, software, and firmware.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the processes illustrated in FIGS. 3D and 4A-4C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 1005, etc.), a combination of hardware and software (e.g., software 1015), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
obtaining, by a device, decommission and consolidation information pertaining to a network, wherein the decommission and consolidation information includes network configuration information, wherein the decommission and consolidation information includes network element information, financial information that includes customer billing information, lease contract information that includes penalty information for disconnecting before the lease expires, network element utilization information, cost information including cost of each leased network element and subtending cost, and hubbing restrictions that limit circuit re-homing based on local exchange carrier-imposed rules;
selecting, by the device, a network element included in the decommission and consolidation information, wherein the network element is a leased network element;
calculating, by the device, a break-even value associated with the network element, wherein the break-even value is based on monetary penalties associated with terminating a lease of the network element before a term of the lease expires and a total cost associated with the leased network element;
comparing, by the device, the break-even value to a threshold break-even value;
simulating, by the device, a move of a demand associated with the network element to another network element in response to the break-even value being less than the threshold break-even value based on the comparing;
storing, by the device, simulation data that includes the move; and
outputting, by the device, the simulation data to another device to reconfigure the network based on the simulation data.

2. The method of claim 1, further comprising: generating a report that includes a summary of cost information, number of initial network resources, number of consolidated network resources and number of decommissioned network resources.

3. The method of claim 1, wherein the network element is an entrance facility associated with a hub, and the calculating comprises:
calculating the break-even value of the entrance facility;
determining whether the entrance facility is designated for exclusion from consolidation; and
simulating the move of the demand associated with the entrance facility in response to determining that the entrance facility is not designated for exclusion from consolidation.

4. The method of claim 3, further comprising:
identifying a rider associated with the entrance facility;
determining whether a demand associated with the rider can be moved to an optimal hub, wherein the optimal hub is a hub in which a monetary cost is less than a monetary cost of the rider that is associated with the hub associated with the entrance facility; and
simulating a move of the demand associated with the rider to the optimal hub in response to determining that the demand associated with the rider can be moved to the optimal hub.

5. The method of claim 4, further comprising:
determining whether the demand associated with the rider can be moved to another entrance facility associated with the hub, which is associated with the entrance facility, in response to determining that the demand associated with the rider cannot be moved to the optimal hub; and
simulating the move of the demand associated with the rider to the other entrance facility in response to determining that the demand associated with the rider can be moved to the other entrance facility.

6. The method of claim 5, further comprising:
determining whether the demand associated with the rider can be moved to another hub in response to determining that the demand associated with the rider cannot be moved to the other entrance facility associated with the hub, which is associated with the entrance facility;
calculating a new break-even value in response to determining that the demand associated with the rider can be moved to another hub;
comparing the new break-even value to the break-even value; and
simulating a move of the demand associated with the rider to the other hub in response to a result of the comparing that indicates that the new break-even value is less than the break-even value.

7. The method of claim 6, further comprising:
calculating subtending costs associated with the rider in reference to the other hub;
comparing the subtending costs to existing costs associated with the rider; and
calculating the new break-even value in response to a result of the comparing that indicates that the subtending costs are less than the existing costs.

8. The method of claim 1, further comprising:
simulating a decommission of the network when all demands associated with the network element are moved from the network element;
storing simulation data that includes the decommission; and
outputting the simulation data that includes the decommission to the other device to reconfigure the network based on the simulation data that includes the decommission.

9. A device comprising:
a communication interface;
one or more memories, wherein the one or more memories store instructions; and
one or more processors, wherein the one or more processors execute the instructions to:
receive decommission and consolidation information pertaining to a network, wherein the decommission and consolidation information includes network configuration information, wherein the decommission and consolidation information includes network element information, financial information that includes customer billing information, lease contract information that includes penalty information for disconnecting before the lease expires, network element utilization information, cost information including cost of each leased network element and subtending cost, and hubbing restrictions that limit circuit re-homing based on local exchange carrier-imposed rules;
select a network element included in the decommissioning and consolidation information, wherein the network element is a leased network element;
calculate a break-even value associated with the network element, wherein the break-even value is based on monetary penalties associated with terminating a lease of the network element before a term of the lease expires and a total cost associated with the leased network element;
compare the break-even value to a threshold break-even value;
simulate a move of a demand associated with the network element to another network element in response to the break-even value being less than the threshold break-even value;
store simulation data that includes the move; and
output, via the communication interface, the simulation data to another device to reconfigure the network based on the simulation data.

10. The device of claim 9, wherein the one or more processors further execute the instructions to:
receive at least one of a break-even parameter that regulates up-front costs due to consolidation or a spare capacity parameter that regulates an amount of left-over capacities of network resources; and wherein when simulating the move, the one or more processors further execute the instructions to:
simulate the move based on the at least one of the break-even parameter or the spare capacity parameter.

11. The device of claim 9, wherein the network element is an entrance facility associated with a hub, and wherein the one or more processors further execute the instructions to:
calculate the break-even value of the entrance facility;
determine whether the entrance facility is designated for exclusion from consolidation; and
simulate the move of the demand associated with the entrance facility in response to determining that the entrance facility is not designated for exclusion from consolidation.

12. The device of claim 11, wherein the one or more processors further execute the instructions to:
identify a rider associated with the entrance facility;
determine whether a demand associated with the rider can be moved to an optimal hub, wherein the optimal hub is a hub in which a monetary cost is less than a monetary cost of the rider that is associated with the hub associated with the entrance facility; and
simulate a move of the demand associated with the rider to the optimal hub in response to determining that the demand associated with the rider can be moved to the optimal hub.

13. The device of claim 12, wherein the one or more processors further execute the instructions to:
determine whether the demand associated with the rider can be moved to another entrance facility associated with the hub, which is associated with the entrance facility, in response to determining that the demand associated with the rider cannot be moved to the optimal hub; and
simulate the move of the demand associated with the rider to the other entrance facility in response to determining that the demand associated with the rider can be moved to the other entrance facility.

14. The device of claim 13, wherein the one or more processors further execute the instructions to:
determine whether the demand associated with the rider can be moved to another hub in response to determining that the demand associated with the rider cannot be moved to the other entrance facility associated with the hub, which is associated with the entrance facility;
calculate a new break-even value in response to determining that the demand associated with the rider can be moved to another hub;
compare the new break-even value to the break-even value; and
simulate a move of the demand associated with the rider to the other hub in response to a result of the comparing that indicates that the new break-even value is less than the break-even value.

15. The device of claim 14, wherein the one or more processors further execute the instructions to:
calculate subtending costs associated with the rider in reference to the other hub;

compare the subtending costs to existing costs associated with the rider; and calculate the new break-even value in response to a result of the comparing that indicates that the subtending costs are less than the existing costs.

16. The device of claim 13, wherein the one or more processors further execute the instructions to:

receive a user selection that designates a network element for forced decommission;

identify whether there is spare capacity to move a demand associated with the designated network element to another network element;

simulate the decommissioning of the designated network element in response to identifying that there is spare capacity;

store simulation data that includes the decommissioning of the designated network element; and output the simulation data to the other device to provide for the decommissioning of the designated network element.

17. The device of claim 16, wherein the one or more processors further execute the instructions to:

create a new network element to accommodate the demand associated with the designated network element in response to identifying that there is not spare capacity to move the demand associated with the designated network element to the other network element; and simulate the decommissioning of the designated network by moving the demand associated with the designated network element to the new network element.

18. The device of claim 9, wherein the one or more processors further execute the instructions to:

display a user interface that permits a user to at least one of designate a network element for decommission, designate a network element for exclusion from consolidation, or designate a maximum utilization associated with a network element.

19. A method comprising:

obtaining, by a device, decommission and consolidation information pertaining to a network, wherein the decommission and consolidation information includes network configuration information, financial information that includes customer billing information, lease contract information that includes penalty information for disconnecting before the lease expires, network element utilization information, cost information including cost of each leased network element and subtending cost, and hubbing restrictions that limit circuit re-homing based on local exchange carrier-imposed rules;

selecting, by the device, a network element included in the decommission and consolidation information, wherein the network element is a leased network element;

calculating, by the device, a value associated with the network element, wherein the value is calculated based on a monetary penalty cost pertaining to an early release from a lease of the network element;

comparing, by the device, the value to a threshold value;

simulating, by the device, a move of a demand associated with the network element to another network element in response to the value being less than the threshold value;

storing, by the device, simulation data that includes the move; and outputting, by the device, the simulation data to another device to reconfigure the network based on the simulation data.

20. The method of claim 19, further comprising:

recursively performing the selecting, the calculating, the comparing, the simulating, and the storing based on a set of leased network elements included in the decommission and consolidation information.

* * * * *